United States Patent
Fan et al.

(10) Patent No.: US 11,650,794 B2
(45) Date of Patent: May 16, 2023

(54) ELECTRONIC CONTROL APPARATUS

(71) Applicant: DENSO TEN Limited, Kobe (JP)

(72) Inventors: Dongliang Fan, Kobe (JP); Hironori Yohata, Kobe (JP); Shigeto Umeyama, Kobe (JP)

(73) Assignee: DENSO TEN Limited, Kobe (JP)

( * ) Notice: Subject to any disclaimer, the term of this patent is extended or adjusted under 35 U.S.C. 154(b) by 215 days.

(21) Appl. No.: 17/191,848

(22) Filed: Mar. 4, 2021

(65) Prior Publication Data

US 2021/0294574 A1 Sep. 23, 2021

(30) Foreign Application Priority Data

Mar. 19, 2020 (JP) .............................. JP2020-049558

(51) Int. Cl.
*G06F 7/57* (2006.01)
*G06F 15/80* (2006.01)
*G06F 5/01* (2006.01)

(52) U.S. Cl.
CPC ................. *G06F 7/57* (2013.01); *G06F 5/01* (2013.01); *G06F 15/80* (2013.01)

(58) Field of Classification Search
CPC ............... G06F 7/57; G06F 5/01; G06F 15/80
See application file for complete search history.

(56) References Cited

U.S. PATENT DOCUMENTS

| | | | |
|---|---|---|---|
| 6,336,172 B1 * | 1/2002 | Day, III ................ | G06F 3/0686 714/6.32 |
| 9,524,324 B1 * | 12/2016 | Lakhani .................. | G06F 16/27 |
| 2001/0049765 A1 * | 12/2001 | Matsuura ............ | B60R 16/0232 711/170 |
| 2004/0249934 A1 * | 12/2004 | Anderson ............... | H04L 51/06 709/224 |
| 2016/0364226 A1 * | 12/2016 | Takano ............... | G06F 9/45558 |
| 2018/0232224 A1 * | 8/2018 | Mori ........................ | G06F 1/24 |
| 2020/0143048 A1 * | 5/2020 | Onda ..................... | G06F 3/0653 |

FOREIGN PATENT DOCUMENTS

JP 2016-012220 A 1/2016

* cited by examiner

*Primary Examiner* — Farley Abad
(74) *Attorney, Agent, or Firm* — Oliff PLC

(57) ABSTRACT

An electronic control apparatus includes a first arithmetic processor and a second arithmetic processor that is communicably connected to the first arithmetic processor. The second arithmetic processor includes a controller configured to (i) shift to a rewriting wait state after outputting a request signal that requests a program rewriting to the first arithmetic processor, and (ii) release the rewriting wait state and shift to a program rewriting process after a predetermined wait time that allows the first arithmetic processor to shift to the program rewriting process elapses after outputting the request signal.

6 Claims, 4 Drawing Sheets

ELECTRONIC CONTROL APPARATUS

BACKGROUND OF THE INVENTION

Field of the Invention

The invention relates to an electronic control apparatus and a program rewriting control method.

Description of the Background Art

Conventionally, in an electronic control apparatus including a plurality of arithmetic processors such as a microcomputer, a technology of rewriting (updating) of programs stored in the arithmetic processors has been proposed (e.g., Japanese Published Unexamined Patent Application No. 2016-12220).

In the electronic control apparatus, a rewriting process is performed between a main arithmetic processor and a sub-arithmetic processor according to a prescribed procedure, but, for example, for specifications of a product such as an apparatus configuration, a situation in which a program rewriting is not executed may occur.

SUMMARY OF THE INVENTION

According to one aspect of the invention, an electronic control apparatus includes a first arithmetic processor and a second arithmetic processor that is communicably connected to the first arithmetic processor. The second arithmetic processor includes a controller configured to (i) shift to a rewriting wait state after outputting a request signal that requests a program rewriting to the first arithmetic processor, and (ii) release the rewriting wait state and shift to a program rewriting process after a predetermined wait time that allows the first arithmetic processor to shift to the program rewriting process elapses after outputting the request signal.

Therefore, an object of the invention is to provide a technology that normally completes a program rewriting according to a predetermined procedure.

These and other objects, features, aspects and advantages of the invention will become more apparent from the following detailed description of the invention when taken in conjunction with the accompanying drawings.

DESCRIPTION OF THE EMBODIMENTS

An electronic control apparatus and a program rewriting control method according to an embodiment will be described in detail below with reference to the drawings. This invention is not limited to the embodiment described below.

<1. First>

Figure 1:
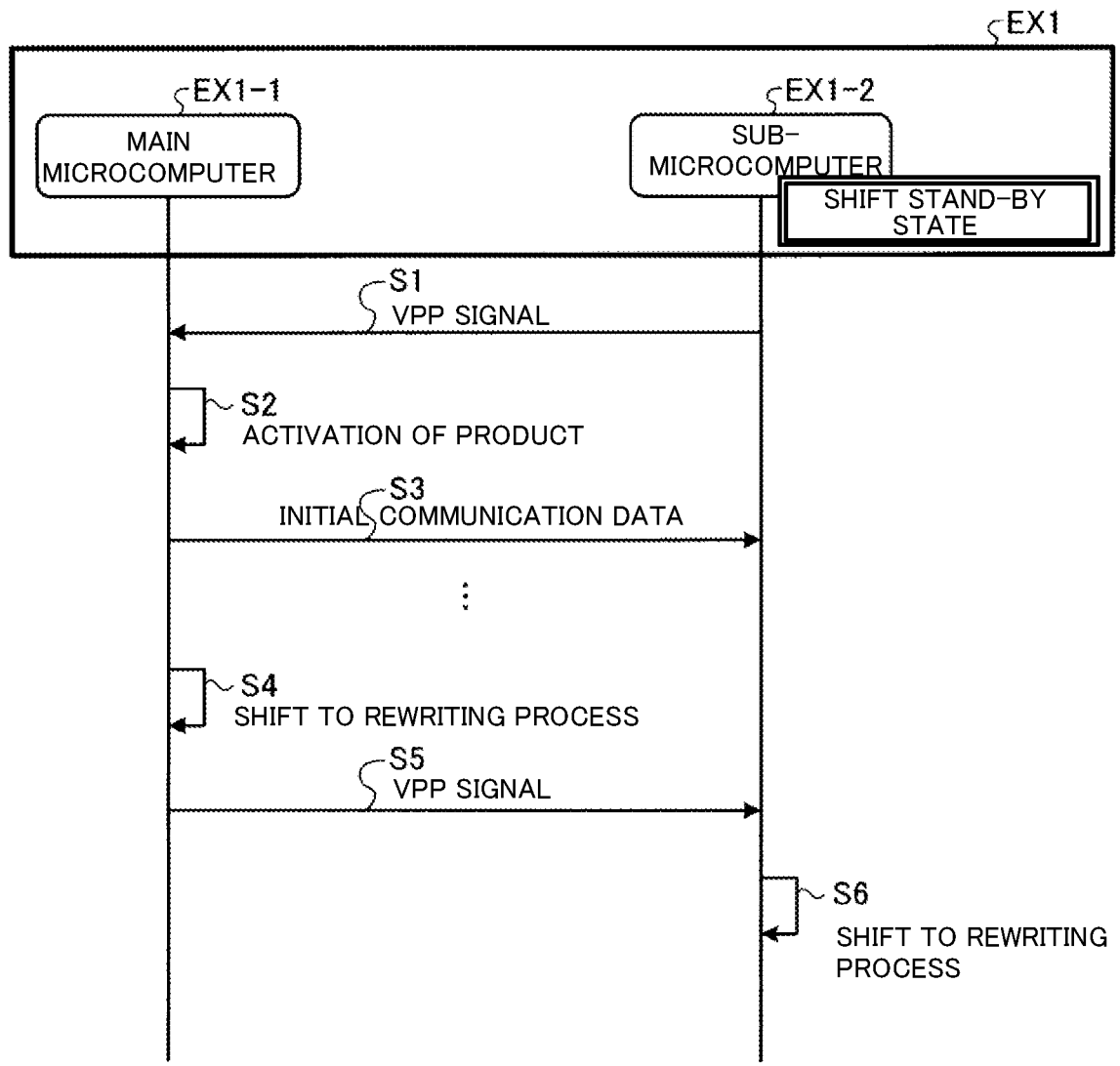
FIG. 1 is a diagram illustrating one example of a program rewriting procedure (Part 1) according to a comparative example.

Conventionally, for example, there is an electronic control apparatus such as an ECU (Electronic Control Unit) to be mounted on a vehicle that includes a plurality of arithmetic processors (microcomputers) including a main microcomputer that controls in-vehicle equipment and a sub-microcomputer that supports operation of the main microcomputer. In such an electronic control apparatus, a rewriting process (reprogramming) of various programs for controlling various equipment to be mounted on the vehicle is performed. FIG. 1 is a diagram illustrating one example of a program rewriting procedure (Part 1) according to a comparative example.

In the example illustrated in FIG. 1, a sub-microcomputer EX1-2 to be mounted on an electronic control apparatus EX1 is in a shift stand-by state for performing the rewriting process of a control program. For example, the sub-microcomputer EX1-2 in the shift stand-by state transmits a VPP signal for requesting a shift to the rewriting process of the control program to a main microcomputer EX1-1 according to activation of a product (sub-microcomputer EX1-2) (a step S1).

After the main microcomputer EX1-1 has received the VPP signal, when a predetermined activation trigger occurs, the main microcomputer EX1-1 executes the control program to normally activate the product (a step S2) and transmits initial communication data to the sub-microcomputer EX1-2 (a step S3).

Subsequently, when the main microcomputer EX1-1 confirms an existence of the VPP signal in an analysis of a receiving signal, the main microcomputer EX1-1 ends the control program and executes reprogramming firmware to shift to the rewriting process of the control program (a step S4). After shifting to the rewriting process, the main microcomputer EX1-1 transmits the VPP signal to the sub-microcomputer EX1-2 (a step S5).

When the sub-microcomputer EX1-2 receives the VPP signal from the main microcomputer EX1-1, the sub-microcomputer EX1-2 shifts to the rewriting process of the control program (a step S6).

When the rewriting process of the control program is performed, it is necessary to end the control program during normal operation and execute the reprogramming firmware to shift to a state in which the rewriting process can be executed. In the electronic control apparatus EX1 having a redundant microcomputer configuration exemplified in FIG. 1, when both the main microcomputer EX1-1 and the sub-microcomputer EX1-2 perform the rewriting process of the control program, both the main microcomputer EX1-1 and the sub-microcomputer EX1-2 need to shift to the state in which the rewriting process can be executed. At this time, as shown in the rewriting procedure (Part 1) of FIG. 1, it is necessary that the sub-microcomputer EX1-2 should shift to the rewriting process, after the main microcomputer EX1-1 has shifted to the rewriting process.

Figure 2:
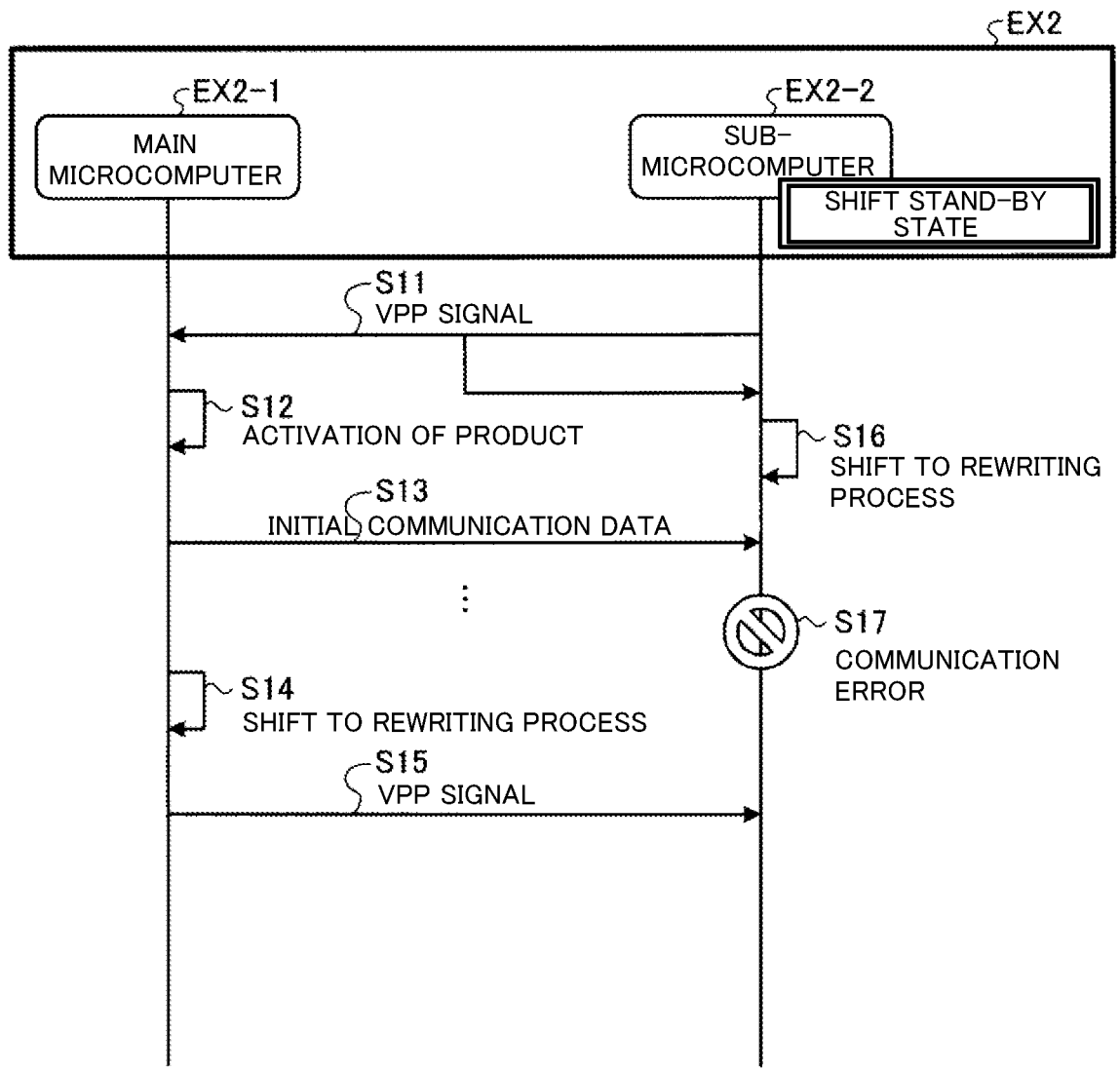
FIG. 2 is a diagram illustrating one example of a program rewriting procedure (Part 2) according to a comparative example.

By the way, there are some electronic control apparatuses that include a hardware configuration in which a signal output from a microcomputer is fed back to the microcomputer as an output source of the signal in order to confirm that the signal has been output. For example, the VPP signal is an important signal for causing normal operation of control target equipment performed by the control program to forcibly end and shift the control target equipment to the rewriting process of the control program. In order to perform the rewriting process while confirming that an important signal such as the VPP signal has been output, a method of feedbacking the signal output from an own apparatus is introduced. A rewriting procedure of the control program in such a method will be described below. FIG. 2 is a diagram illustrating one example of a program rewriting procedure (Part 2) according to a comparative example.

As illustrated in FIG. 2, a sub-microcomputer EX2-2 to be mounted on an electronic control apparatus EX2 is in a shift stand-by state for performing a rewriting process of a control program similar to the example shown in FIG. 1.

For example, the sub-microcomputer EX2-2 in the shift stand-by state transmits a VPP signal for requesting a shift to the rewriting process of the control program to a main microcomputer EX2-1 according to activation of a product (sub-microcomputer EX2-2) (a step S11).

After the main microcomputer EX2-1 has received the VPP signal, when a predetermined activation trigger occurs, the main microcomputer EX2-1 executes the control program to normally activate the product (a step S12) and transmits initial communication data to the sub-microcomputer EX2-2 (a step S13).

Subsequently, when the main microcomputer EX2-1 confirms an existence of the VPP signal in an analysis of a receiving signal, the main microcomputer EX2-1 ends the control program and executes reprogramming firmware to shift to the rewriting process of the control program (a step S14). After shifting to the rewriting process, the main microcomputer EX2-1 transmits the VPP signal to the sub-microcomputer EX2-2 (a step S15).

On the other hand, since the VPP signal transmitted to the main microcomputer EX2-1 in the step S11 is fed back and input to the sub-microcomputer EX2-2, the sub-microcomputer EX2-2 executes the reprogramming firmware to be in a state in which the sub-microcomputer EX2-2 has shifted to the rewriting process of the control program before receiving the VPP signal transmitted from the main microcomputer EX2-1 (a step S16).

As a result, since the sub-microcomputer EX2-2 receives the initial communication data that is normally supposed to be received before shifting to the rewriting process after shifting to the rewriting process, a communication error occurs (a step S17). After the sub-microcomputer EX2-2 has shifted to the rewriting process, the sub-microcomputer EX2-2 receives data from the main microcomputer EX2-1, which includes the initial communication data that is not program rewriting data. Thus, the sub-microcomputer EX2-2 does not normally execute the rewriting process of the control program.

As described above, even when the sub-microcomputer EX2-2 shifts to the rewriting process, after the main microcomputer EX2-1 has shifted to the rewriting process, like the electronic control apparatus EX2 shown in FIG. 2, for specifications of the product, a situation that the control program is not rewritten occurs.

Therefore, according to this embodiment, it is possible to provide an electronic control apparatus that normally completes rewriting of various programs according to a predetermined procedure and a program rewriting control method.

<2. Configuration of Electronic Control Apparatus>

Figure 3:
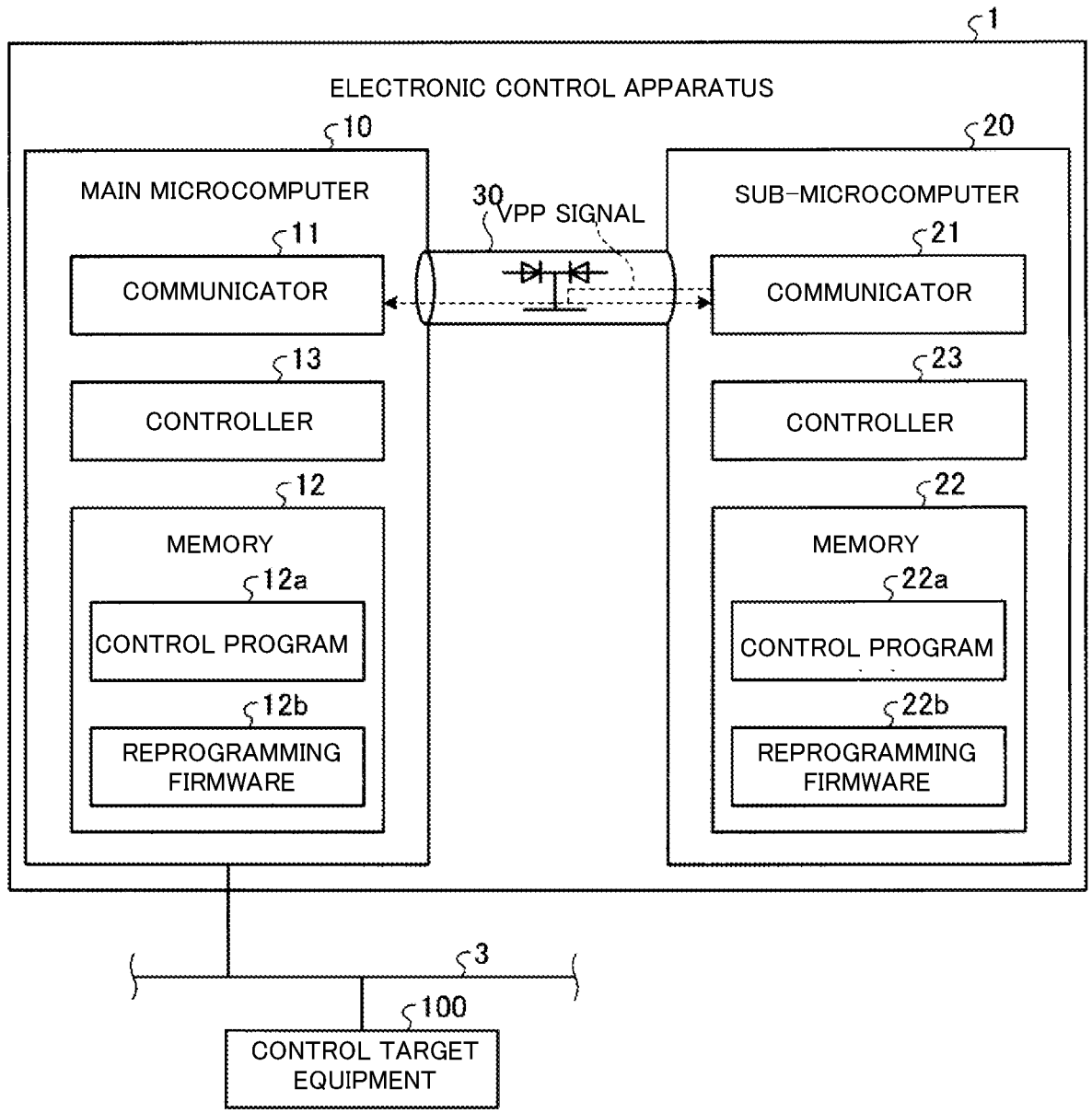
FIG. 3 is a block diagram illustrating a configuration example of an electronic control apparatus.

A configuration of an electronic control apparatus 1 according to an embodiment will be described with reference to FIG. 3. FIG. 3 is a block diagram illustrating a configuration example of the electronic control apparatus 1. In the block diagram shown in FIG. 3, only elements necessary to describe the features of this embodiment are illustrated as functional blocks, and general elements are not illustrated for simplicity purposes.

In other words, each element illustrated in FIG. 3 is just functional and conceptual, and is not necessarily configured as illustrated in a physical sense. For example, a distributed and/or integrated version of each functional block is not limited to those illustrated, and its entirety or a part thereof may be functionally or physically distributed or integrated in an arbitrary unit depending on various loads, use situations, and the like.

The electronic control apparatus 1 illustrated in FIG. 3 is mounted on a vehicle such as a hybrid vehicle or an electric vehicle and functions as an electronic control apparatus that executes a program rewriting control method. Examples of the electronic control apparatus 1 include an EFI (Electrical Fuel Injection)-ECU, an EV (Electric Vehicle)-ECU, an HEV (Hybrid Electric Vehicle)-ECU, and the like.

The electronic control apparatus 1 is connected to control target equipment 100 via an in-vehicle network 3. For example, a network constructed according to communication standards such as a LIN (Local Interconnect Network), a CAN (Controller Area Network), and the like, may be used. The in-vehicle network 3 may be constructed based on a next generation communication standard other than the LIN and the CAN, or may be constructed by a wire. The control target equipment 100 refers to equipment to be mounted on the vehicle such as an engine or an automatic transmission to be mounted on the vehicle.

As illustrated in FIG. 3, the electronic control apparatus 1 includes a main microcomputer 10, a sub-microcomputer 20 and a communication line 30.

The main microcomputer 10 mainly controls the control target equipment 100. The main microcomputer 10 functions as a first arithmetic processor. The sub-microcomputer 20 mainly supports operation of the main microcomputer 10. The sub-microcomputer 20 functions as a second arithmetic processor.

The main microcomputer 10 can communicate data for exchanging various information with the control target equipment 100 to be connected to the in-vehicle network 3, other electronic control apparatuses, in-vehicle tools, and the like. The sub-microcomputer 20 acquires the information transmitted from the control target equipment 100 to be connected to the in-vehicle network 3, other electronic apparatuses, the in-vehicle tools, and the like, via the main microcomputer 10.

As illustrated in FIG. 3, the main microcomputer 10 includes a communicator 11, a memory 12, and a controller 13.

The communicator 11 performs a serial communication with the sub-microcomputer 20 via the communication line 30. The communicator 11 can communicate with the sub-microcomputer 20 by using a communication method of an asynchronous serial communication such as a UART (Universal Asynchronous Receiver Transmitter).

The communication line 30 is, for example, configured by an OR circuit. The communicator 11 receives a transmitted signal that is fed back and inputs the signal to an own apparatus (main microcomputer 10).

The memory 12 stores various programs for implementing various functions executed by the controller 13. The memory 12 is, for example, implemented by a storage device such as a non-volatile memory, a data flash, or a hard disk drive.

The memory 12 stores a control program 12a and reprogramming firmware 12b in a predetermined storage area.

The control program 12a provides a function for controlling the control target equipment 100. The control program 12a corresponds to product software that is written when shipping a product (electronic control apparatus 1) or rewritten after shipping the product.

The reprogramming firmware 12b provides a function for rewriting the control program 12a.

The controller 13 controls the main microcomputer 10. The controller 13 is, for example, implemented by a processor such as a CPU (Central Processing Unit), an MPU (Micro Processing Unit), a GPU (Graphics Processing Unit), or the like. The controller 13, for example, the processor uses a RAM (Random Access Memory) as a work area to execute various programs stored in the main microcomputer 10 and implement various processes of the main microcomputer 10. The controller 13 may be implemented by an integrated circuit such as an ASIC (Application Specific Integrated Circuit) or an FPGA (Field Programmable Gate Array). Each of the CPU, the MPU, the ASIC and the FPGA may be regarded as the controller.

The controller 13 realizes control of the control target equipment 100 by executing the control program 12a.

The controller 13 performs a rewriting process for rewriting the control program 12a by executing the reprogramming firmware 12b.

Specifically, for example, when the controller 13 receives a VPP signal (one example of a request signal) from the sub-microcomputer 20, the controller 13 executes the control program 12a to activate a product (main microcomputer 10) and transmits initial communication data to the sub-microcomputer 20. After transmission of the initial communication data, the controller 13 ends the control program 12a and executes the reprogramming firmware 12b to shift to the rewriting process for rewriting the control program 12a and transmits the VPP signal to the sub-microcomputer 20. By this VPP signal, the sub-microcomputer 20 recognizes that the main microcomputer 10 has shifted to the rewriting process of the control program 12a.

For example, the controller 13 may acquire a rewriting program from a program rewriting tool (not shown) to be connected to the in-vehicle network 3, or the like. The controller 13 may provide the acquired rewriting program to the sub-microcomputer 20.

As illustrated in FIG. 3, the sub-microcomputer 20 includes a communicator 21, a memory 22, and a controller 23.

The communicator 21 performs a serial communication with the sub-microcomputer 20 via the communication line 30. The communicator 21 can communicate with the main microcomputer 10 by using a communication method of an asynchronous serial communication such as a UART (Universal Asynchronous Receiver Transmitter).

The VPP signal to be transmitted from the communicator 21 to the main microcomputer 10 is fed back by the OR circuit of the communication line 30. Thus, the communicator 21 receives the VPP signal to be transmitted to the main microcomputer 10 and inputs the VPP signal to an own apparatus (sub-microcomputer 20).

The memory 22 stores various programs for implementing various functions executed by the controller 23. The memory 22 is, for example, implemented by a storage device such as a non-volatile memory, a data flash, or a hard disk drive.

The memory 22 stores a control program 22a and reprogramming firmware 22b in a predetermined storage area.

The control program 22a provides a function for supporting the operation of the main microcomputer 10 in relation to the control of the control target equipment 100. The control program 22a corresponds to product software that is written when shipping the product (electronic control apparatus 1) or rewritten after shipping the product.

The reprogramming firmware 22b provides a function for rewriting the control program 22a.

The controller 23 controls the sub-microcomputer 20. The controller 23 is, for example, implemented by a processor such as a CPU (Central Processing Unit), an MPU (Micro Processing Unit), a GPU (Graphics Processing Unit), or the like. The controller 23, for example, the processor uses a RAM (Random Access Memory) as a work area to execute various programs stored in the sub-microcomputer 20 and implement various processes of the sub-microcomputer 20. The controller 13 may be implemented by an integrated circuit such as an ASIC (Application Specific Integrated Circuit) or an FPGA (Field Programmable Gate Array). Each of the CPU, the MPU, the ASIC and the FPGA may be regarded as the controller.

The controller 23 supports the operation of the main microcomputer 10 in relation to the control of the control target equipment 100 by executing the control program 22a.

The controller 23 performs a rewriting process for rewriting the control program 22a by executing the reprogramming firmware 22b.

Specifically, for example, when the controller 23 is in a stand-by state before shifting to the rewriting process, the controller 23 transmits the VPP signal (one example of the request signal) to the main microcomputer 10 according to activation of the product. After transmission of the VPP signal, the controller 23 immediately shifts to a rewriting wait state (wait state) that waits for the shift to the rewriting process of the control program 12a. Although the VPP signal to be transmitted to the main microcomputer 10 is fed back by the communication line 30 (OR circuit) and input to the own apparatus (sub-microcomputer 20), after transmission of the VPP signal, the controller 23 immediately shifts to the wait state of the rewriting process so as not to shift to the rewriting process of the control program 12a by the input of the VPP signal fed back by the communication line 30. When the controller 23 is in the wait state, the controller 23 discards data received from the main microcomputer 10.

After a predetermined wait time elapses after the controller 23 has output the VPP signal, the controller 23 releases the rewriting wait state and shifts to the rewriting process of the control program 22a. The predetermined wait time may be a time that allows the main microcomputer 10 to shift to the rewriting process. For example, the predetermined wait time may be determined based on a maximum activation time of the main microcomputer 10. As a result, after the main microcomputer 10 has surely completed the shift to the rewriting process, the sub-microcomputer 20 releases the wait state and shifts to the rewriting process. The maximum activation time is, for example, a maximum time that is set based on a polling period in which the main microcomputer 10 analyzes a receiving signal, a reset time before the main microcomputer 10 activates the reprogramming firmware 12b after end of the control program 12a, and the like. For example, as the wait time, a time 1.5 times as long as the maximum activation time of the main microcomputer 10 is adopted. When the maximum activation time of the main microcomputer 10 is 200 ms (millisecond), the wait time is 300 ms (millisecond).

As described above, in the electronic control apparatus 1, it is possible to normally complete the rewriting process of the control program according to a predetermined procedure. That is, according to the electronic control apparatus 1, after the wait time that allows the main microcomputer 10 to shift to the rewriting process elapses, the sub-microcomputer 20 shifts to the rewriting process so that a shift sequence to the rewriting process of the control program (the main microcomputer 10 to the sub-microcomputer 20) is assured. As a result, the sub-microcomputer 20 normally processes program rewriting data to be transmitted from the main microcomputer 10 and normally completes the rewriting process of the control program 22a.

<3. Process by Electronic Control Apparatus>

Figure 4:
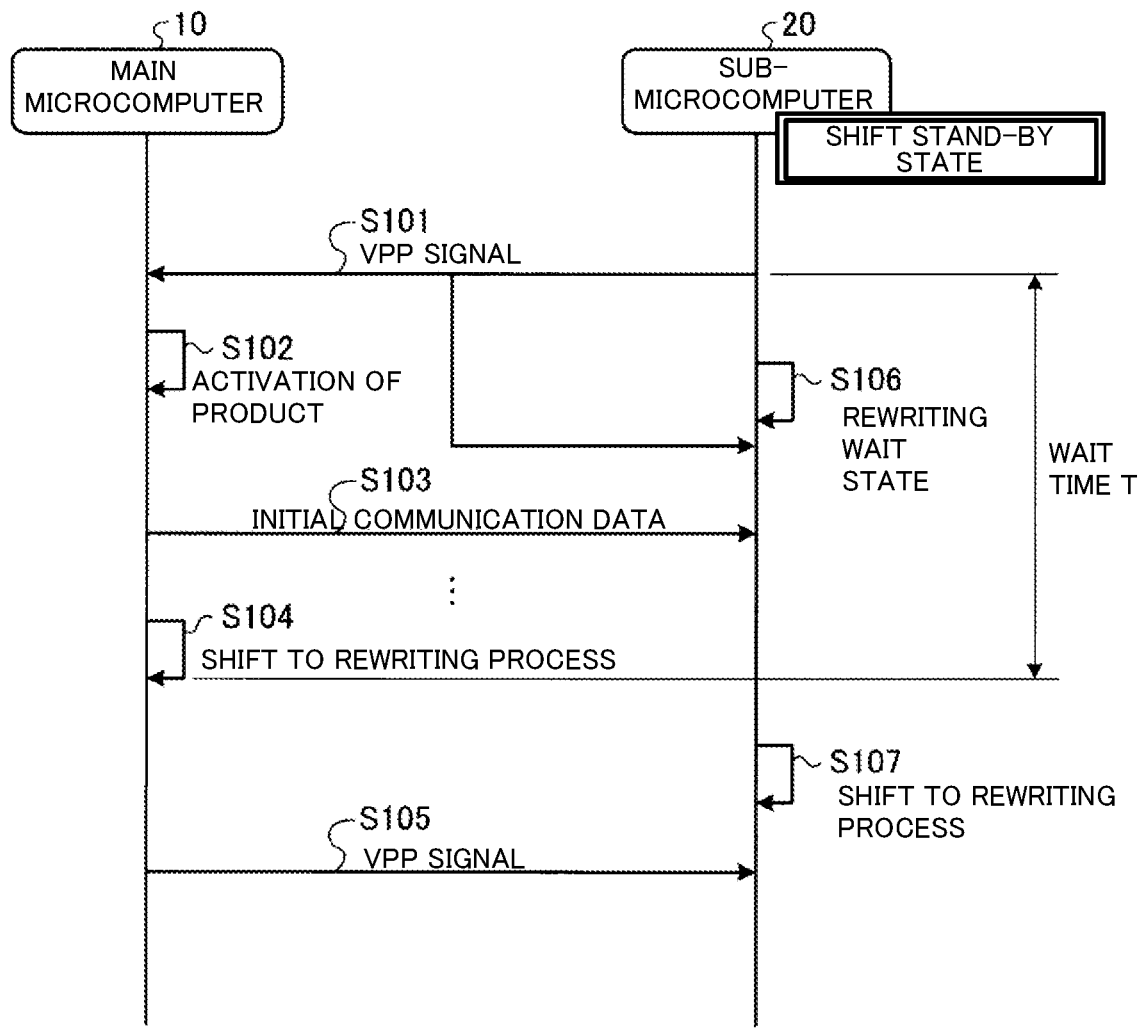
FIG. 4 is a sequence diagram illustrating one example of a processing procedure in the electronic control apparatus.

FIG. 4 is a sequence diagram illustrating one example of a processing procedure in the electronic control apparatus 1. The processing procedure illustrated in FIG. 4 is performed by the controller 13 of the main microcomputer 10 and the controller 23 of the sub-microcomputer 20. FIG. 4 illustrates one example of the processing procedure when the sub-microcomputer 20 is in a shift stand-by state for performing the rewriting process of the control program 22a.

As illustrated in FIG. 4, the sub-microcomputer 20 in the shift stand-by state, for example, transmits the VPP signal for requesting a shift to the rewriting process of the control program 22a to the main microcomputer 10 according to the activation of the product (a step S101).

After the main microcomputer 10 has received the VPP signal, when a predetermined activation trigger occurs, the main microcomputer 10 executes the control program 12a to activate the product (a step S102) and transmits the initial communication data to the sub-microcomputer 20 (a step S103).

Subsequently, when the main microcomputer 10 confirms a receipt of the VPP signal, the main microcomputer 10 ends the control program 12a and executes the reprogramming firmware 12b to shift to the rewriting process of the control program 12a (a step S104).

After shifting to the rewriting process, the main microcomputer 10 transmits the VPP signal to the sub-microcomputer 20 (a step S105).

On the other hand, after the sub-microcomputer 20 has transmitted the VPP signal to the main microcomputer 10 in the step S101, the sub-microcomputer 20 immediately shifts to the rewriting wait state of the control program 22a (a step S106).

After a predetermined wait time T elapses after the sub-microcomputer 20 has output the VPP signal, the sub-microcomputer 20 releases the rewriting wait state and shifts to the rewriting process of the control program 22a (a step S107). The wait time T is a time that allows the main microcomputer 10 to shift to the rewriting process. For example, the wait time T may be determined based on the maximum activation time of the main microcomputer 10.

As described above, according to the electronic control apparatus 1, on the condition that the elapsed time after the sub-microcomputer 20 has output the VPP signal exceeds the predetermined wait time (e.g., the wait time T) that allows the main microcomputer 10 to shift to the rewriting process, the sub-microcomputer 20 shifts to the rewriting process so that the shift sequence to the rewriting process of the control program (the main microcomputer 10 to the sub-microcomputer 20) is assured. As a result, the sub-microcomputer 20 normally processes the program rewriting data to be transmitted from the main microcomputer 10 and normally completes the rewriting process of the control program 22a.

According to the electronic control apparatus 1, the sub-microcomputer 20 releases the rewriting wait state and determines the predetermined wait time before shifting to the rewriting process based on the maximum activation time of the main microcomputer 10. As a result, after the main microcomputer 10 has surely completed the shift to the rewriting process, the sub-microcomputer 20 releases the wait state and shifts to the rewriting process.

<4. Others>

Although, in the above embodiment, the electronic control apparatus 1 to be mounted on the vehicle has been described, the configuration described above may be also applied to various products that have a redundant microcomputer configuration in which one microcomputer serves as a gateway of the other microcomputer and for which the shift sequence to a program rewriting process is needed to be assured.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. An electronic control apparatus comprising:
   a first arithmetic processor having a first memory; and
   a second arithmetic processor having a second memory and that is communicably connected to the first arithmetic processor, wherein
   the second arithmetic processor includes a controller configured to (i) shift to a rewriting wait state in which the second arithmetic processor waits to perform a program rewriting process to the second memory of the second arithmetic processor after outputting a request signal to the first arithmetic processor that requests the first arithmetic processor to perform the program rewriting process to the first memory of the first arithmetic processor, and (ii) release the rewriting wait state and shift to the program rewriting process to the second memory of the second arithmetic processor after a predetermined wait time elapses from the outputting of the request signal, the predetermined wait time allowing the first arithmetic processor to shift to the program rewriting process to the first memory of the first arithmetic processor.

2. The electronic control apparatus according to claim 1, wherein
   the controller is further configured to determine the predetermined wait time based on a maximum activation time of the first arithmetic processor.

3. A program rewriting control method that is executed in an electronic control apparatus that includes a first arithmetic processor having a first memory and a second arithmetic processor having a second memory and that is communicably connected to the first arithmetic processor, the method comprising the steps of:
   (a) the second arithmetic processor outputting a request signal to the first arithmetic processor that requests the first arithmetic processor to perform a program rewriting process to the first memory of the first arithmetic processor;
   (b) the second arithmetic processor, after outputting the request signal to the first arithmetic processor, shifting to a rewriting wait state in which the second arithmetic processor waits to perform the program rewriting process to the second memory of the second arithmetic processor; and (c) the second arithmetic processor releasing the rewriting wait state and shifting to the program rewriting process to the second memory of the second arithmetic processor after a predetermined wait time elapses from the outputting of the request signal, the predetermined wait time allowing the first arithmetic processor to shift to the program rewriting process to the first memory of the first arithmetic processor.

4. The program rewriting control method according to claim 3, wherein the second arithmetic processor determines the predetermined wait time based on a maximum activation time of the first arithmetic processor.

5. The electronic control apparatus according to claim 1, wherein the controller discards information received from the first arithmetic processor while the second arithmetic processor is in the rewriting wait state.

6. The program rewriting control method according to claim 3, wherein the second arithmetic processor discards information received from the first arithmetic processor while the second arithmetic processor is in the rewriting wait state.

* * * * *